United States Patent [19]

Hisazumi et al.

[11] Patent Number: 4,764,406
[45] Date of Patent: Aug. 16, 1988

[54] SMOKABLE SYNTHETIC FOOD-PACKAGING FILM

[75] Inventors: Nobuyuki Hisazumi, Tsuchiura; Shinichiro Funabashi, Iwaki; Yoshihiko Tomioka, Tokyo, all of Japan

[73] Assignee: Kureha Kagaku Kogyo Kabushiki Kaisha, Tokyo, Japan

[21] Appl. No.: 892,916

[22] Filed: Aug. 4, 1986

[30] Foreign Application Priority Data

Aug. 6, 1985 [JP] Japan .................................. 60-172643

[51] Int. Cl.[4] ...................... B65D 81/34; B32B 27/08; C08L 29/04
[52] U.S. Cl. .................................. 428/35; 428/474.4; 428/475 S; 428/475.8; 428/476.1; 426/105; 426/135; 138/118.1; 525/57; 525/59
[58] Field of Search .................. 525/57, 59; 138/118.1; 428/35, 36, 474.4, 475.5, 475.8, 476.1; 426/105, 135, 140

[56] References Cited

U.S. PATENT DOCUMENTS

| | | | |
|---|---|---|---|
| 4,243,074 | 1/1981 | Strotzel et al. | 138/118.1 |
| 4,287,217 | 9/1981 | Hammer et al. | 138/118.1 |
| 4,303,711 | 12/1981 | Erk et al. | 138/118.1 |
| 4,347,332 | 8/1982 | Odorzynski et al. | 525/58 |
| 4,427,825 | 1/1984 | Degrassi et al. | 525/58 |
| 4,468,427 | 8/1984 | Degrassi et al. | 428/475.8 |
| 4,500,677 | 2/1985 | Maruhashi et al. | 525/57 |
| 4,601,424 | 7/1986 | Erk et al. | 138/118.1 |
| 4,659,599 | 4/1987 | Strutzel | 138/118.1 |

Primary Examiner—John E. Kittle
Assistant Examiner—James J. Seidleck
Attorney, Agent, or Firm—Oblon, Fisher, Spivak, McClelland & Maier

[57] ABSTRACT

Disclosed herein is a smokable food-packaging film comprising at least one layer of a mixture of 45 to 85 wt % polyamide, 10 to 45 wt % copolymer of olefin and vinyl alcohol, and 5 to 30 wt % polyolefin, in which the mixture falls in the pantagonal range defined in FIG. 1 by linear lines connecting the points A, B, C, D and E, respectively, said layer having the properties of a permability to 50% concentration of methanol of not less than 200 g/m$^2$.day.atm at a temperature of 60° C. and a relative humidity of 0% and an oxygen gas-permeability of not more than 50 cc/m$^2$.day.atm at a temperature of 30° C. and a relative humidity of 60% and a water vapor-transmission rate of not more than 70 g/m$^2$.day at a temperature of 40° C. and a relative humidity of 90%.

10 Claims, 1 Drawing Sheet

SMOKABLE SYNTHETIC FOOD-PACKAGING FILM

BACKGROUND OF THE INVENTION

The present invention relates to a smokable synthetic food-packaging film and, more particularly, to a smokable synthetic food-packaging film which shows a smoke-permeability and an oxygen-barrier property, and which also has excellent smokability and preserving effect without secondary packaging in plastic bags.

Hitherto, the packages for foodstuffs such as prepared meat which is to be smoked is mainly conducted by primary packaging and secondary packaging. For primary packaging, a packaging material is selected so that it is suitable for forming and maintaining the shape of foodstuffs which are packed directly into the packaging material, and for rapidly permeating smoke components during the smoking process. As examples of packaging materials used for primary packaging, casings made from animal intestines such as those of cows, pigs, or sheep, and cellulose casings made of viscose film may be mentioned. These smokable primary packaging materials, however, lack gas-barrier properties and are unsuitable as packaging materials for ordinary food-storage. Therefore, it is necessary to package the foodstuffs again in a film which has a gas-barrier property (secondary packaging).

Other known smokable primary packaging materials are films of natural polymer such as collagens, chitins and polysaccharides, or paper which is impregnated with a polyvinyl alcohol resin ((Japanese Patent Publication No. 47-43198 (1972)), paper impregnated with an ethylene - vinyl alcohol copolymer containing a plasticizer (Japanese Patent Application Laid-Open (KOKAI) No. 52-57347 (1977)), and polyester copolymer films containing polyalkylene oxide (Japanese Patent Publication No. 59-117530 (1984)). These smokable primary packaging materials also have insufficient gas-barrier property, and thus necessitate a secondary packaging for the preservation of the food. Although films which are mechanically perforated or porous films have been proposed in order to improve the smoking properties (British Patent No. 1,397,472), these packaging materials also necessitate secondary packaging. Thus, conventional smokable packaging materials require a secondary packaging process, and as a result there are defects of the increases of the number of manufacturing steps, packaging materials, and packaging machines, and thus increases the manufacturing cost.

As known films having both smoke-permeability and oxygen gas-barrier property, there are films of polyamides such as polycaprolactam and of polymer blends of polyamide and at least one of ionomer resin, modified ethylene-vinyl acetate copolymer and modified polyolefin (European Patent Application No. 0,139,888Al).

European Patent Application No.0,139,888Al suggests that films consisting of polyamides which can absorb at least 3 wt % of their own weight of water up to saturation point, such as, for example, polycaprolactam, polyamino-oenanthic acid amido, polyhexamethylene adipamide and polyhexamethylene sebacamide, and films consisting of polymer blends of polyamides such as those described above, and at least one of ionomer resin, modified ethylene-vinyl acetate copolymer and modified polyolefin, are useful as smokable thermoplastic synthetic casings. However, the only films that are concretely disclosed therein are transparent, colorless shrinkable casings formed of polycaprolactam or polyhexamethylene adipamide. The casings of polycaprolactam and polyhexamethylene adipamide show an insufficient oxygen gas-barrier property, and the casings thereof are therefore inadequate for the prolonged storage periods of foods, in particular, for foodstuffs which are susceptible to oxygen.

Accordingly, it is an object of the present invention to provide a food-packaging film of a thermoplastic resin which has good smokability and excellent oxygen gas-barrier property.

Namely, it is an object of the present invention to provide a smokable food-packaging film which shows such good smoking effect and oxygen gas-barrier property, and can be used to preserve foodstuffs which are susceptible to oxygen for long periods.

As a result of various studies into how to achieve this aim, it has been found by the present inventors that a food package which has smokability and preservability for long periods is obtained without secondary packaging by using a film having at least one layer of a mixture of 45 to 85 wt % polyamide, 10 to 45 wt % copolymer of olefin and vinyl alcohol, and 5 to 30 wt % polyolefin, the layer having the properties of a permeability to 50% concentration of methanol of not less than 200 $g/m^2$.day.atm at a temperature of 60° C. and a relative humidity of 0% and an oxygen gas-permeability of not more than 50 $cc/m^2$.day.atm at a temperature of 30° C. and a relative humidity of 60%. The present invention has been attained on the basis of this finding.

SUMMARY OF THE INVENTION

In a first aspect of the present invention, there is provided a smokable food-packaging film comprising at least one layer of a mixture of 45 to 85 wt % polyamide and 10 to 45 wt % copolymer of olefin and vinyl alcohol, and 5 to 30 wt % polyolefin, in which the mixture falls in the pentagonal range defined in FIG. 1 by linear lines connecting the points A, B, C, D, and E, respectively, the layer having the properties of a permeability to 50% concentration of methanol of not less than 200 $g/m^2$.day.atm at a temperature of 60° C. and a relative humidity of 0%, an oxygen gas-permeability of not more than 50 $cc/m^2$.day.atm at a temperature of 30° C. and a relative humidity of 60%, and a water vapor-transmission rate (WVTR) of not more than 70 $g/m^2$.day at a temperature of 40° C. and a relative humidity of 90%.

In a second aspect of the present invention, there is provided a smokable food-packaging film comprising a layer of a mixture of 45 to 85 wt % polyamide, 10 to 45 wt % copolymer of olefin and vinyl alcohol, and 5 to 30 wt % polyolefin, in which the mixture falls in the pentagonal range defined in FIG. 1 by linear lines connecting the points A, B, C, D and E, respectively, the layer having the properties of a permeability to 50% concentration of methanol of not less than 200 $g/m^2$.day.atm at a temperature of 60° C. and a relative humidity of 0%, an oxygen gas-permeability of not more than 50 $cc/m^2$.day.atm at a temperature of 30° C. and a relative humidity of 60%; and a water vapor-transmission rate (WVTR) of not more than 70 $g/m^2$.day at a temperature of 40° C. and a relative humidity of 90%; and at least one layer selected from the group consisting of (a) an α-olefin copolymer such as polyethylene, polypropylene, polybutene-1, (b) a copolymer of ethylene, propylene or butene-1 and vinyl acetate or (metha)

acrylic ester, (c) a copolymer of ethylene, propylene or butene-1 and (metha) acrylic acid, and a metal salt thereof, (d) an elastomer such as plasticized polyvinyl chloride, polyester and a styrene rubber, (e) a cellulose, and (f) a polyamide having an oxygen gas-permeability of more than 50 cc/m$^2$.day.atm at a temperature of 30° C. and a relative humidity of 60%.

DETAILED DESCRIPTION OF THE INVENTION

Figure 1:
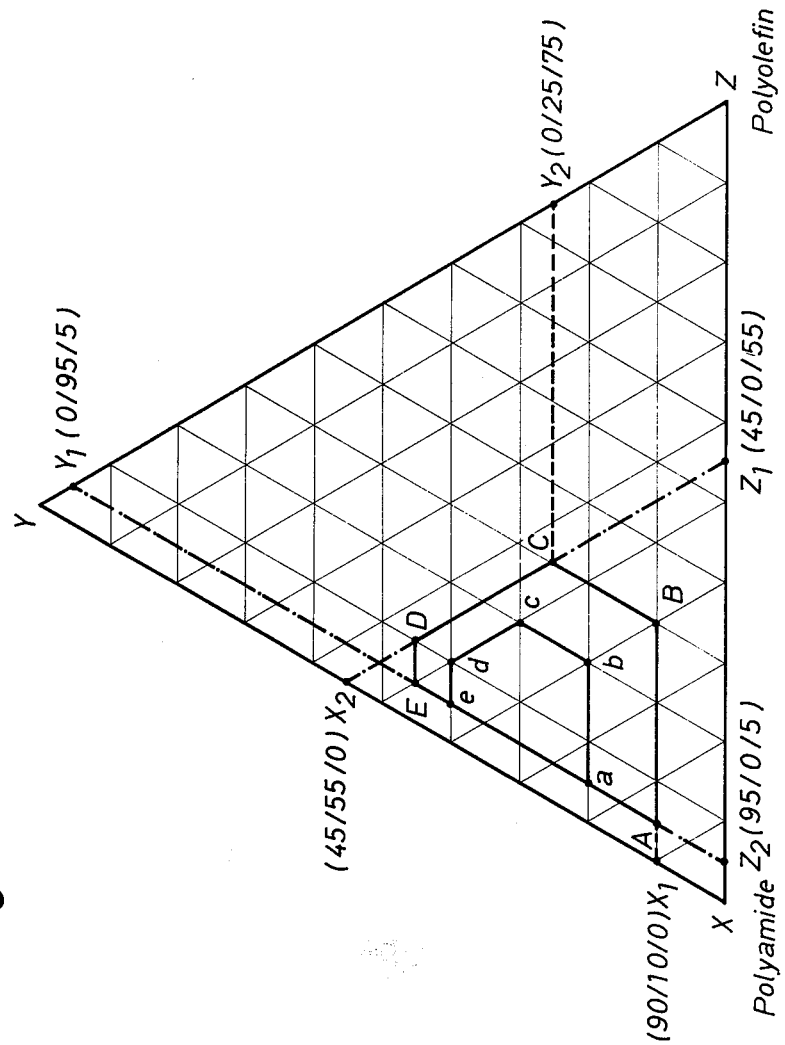
FIG. 1 is a ternary diagram showing the mixing ratio of polyamide, an olefin-vinyl alcohol copolymer, and polyolefin.

A smokable food-packaging film according to the present invention comprises at least one layer of a mixture of 45 to 85 wt % polyamide, and 10 to 45 wt % copolymer of olefin and vinyl alcohol and 5 to 30 wt % polyolefin, in which the mixture falls in the pentagonal range defined in FIG. 1 by linear lines connecting the points A, B, C, D and E, respectively, the layer having the properties of a permeability to 50% concentration of methanol of not less than 200 g/m$^2$.day.atm at a temperature of 60° C. and a relative humidity of 0%, an oxygen gas-permeability of not more than 50 cc/m$^2$.day.atm at a temperature of 30° C. and a relative humidity of 60%, and WVTR of not more than 70 g/m$^2$.day at a temperature of 40° C. and a relative humidity of 90%.

"The concentration of methanol" in the present invention is the relative concentration when the concentration under the saturated vapor pressure of methanol at the temperature is set as 100%.

The permeability to 50% concentration of methanol of a film according to the present invention is not less than 200 g/m$^2$.day.atm, preferably, not less than 300 g/m$^2$.day.atm and, more preferably, not less than 1,000 g/m$^2$.day.atm at a temperature of 60° C. and a relative humidity of 0%.

A film having a methanol-permeability of less than 200 g/m$^2$.day.atm cannot exhibit any smoking effect, even with food which needs only a slight taste and fragrance of smoking. Therefore, a film according to the present invention must have a methanol-permeability of not less than 200 g/m$^2$.day.atm and, more preferably, not less than 300 g/m$^2$.day.atm in order to provide an ordinary smoked flavor. In order to provide an even clearly smoked flavor, the film should have a methanol-permeability of not less than 1,000 g/m$^2$.day.atm and, in order to provide a strongly smoked flavor, which is called heavy smoking, a film having a methanol-permeability of at least 2,000 g/m$^2$.day.atm is used.

The methanol-permeability of a film of a thermoplastic resin layer according to the present invention may be used as a standard for smoking property. The smoke components generated during the heating of a material in a smoking process usually permeate through the food-packaging film and are transferred to the food, thereby producing the characteristic fragrance and taste of smoking. As a result of measuring the permeability to the smoked components of various packaging films, it has been found that the methanol-permeability is suitable as a parameter of smoking property.

Namely, pork sausage meat was packed into tubular casing (thickness: 40 μm) of the materials shown in Table 1, and both ends of each casing were sealed. These sausages were smoked at 60° C. for 75 minutes, and then were subjected to sensory examination with respect to the taste and fragrance of their contents, and their permeabilities to smoke components (model substances) were measured. The results are shown in Table 1.

The evaluation of the sensory examination (panel tests performed by 10 panelists) are as follows.
0: No smokability (smoking has no effect)
1: Slightly recognizable smoked flavor
2: Clearly recognizable smoked flavor
3: Strongly recognizable smoked flavor
4: Extremely strong smoked flavor The permeabilities to smoke components are shown in Table 1 as relative values, based on the assumption that the permeability of nylon 6 to all the smoke components is 1. From these results it can be seen that methanol-permeability is correlated with the evaluation of the sensory examination of smokability.

Since components other than methanol are not related to the evaluations of the sensory examination of smokability, they are not suitable as parameters of the evaluation of smokability.

TABLE 1

| Test Items | Material of Film | | | | |
|---|---|---|---|---|---|
| | Cellulose | Nylon - 6 | Low-density Polyethylene | Plasticized Vinylidene Chloride Copolymer | Polyethylene Terephthalate |
| Sensory Test for Smokability Permeability (Relative Value) | 4 | 3.1 | 2.6 | 1.9 | 0.3 |
| Water Vapor | 10< | 1 | 0.1 | 0.04 | 0.3 |
| Methanol | 1.7 | 1 | 0.2 | 0.1 | 0.01 |
| Acetone | 2 | 1 | 100 | 200 | 1 |
| Ethyl Acetate | 1 | 1 | 17 | 17 | 0.8 |
| Cresol | — | 1 | 250 | 13 | — |

TABLE 1-continued

| Test Items | Material of Film | | | | |
| --- | --- | --- | --- | --- | --- |
| | Cellulose | Nylon - 6 | Low-density Polyethylene | Plasticized Vinylidene Chloride Copolymer | Polyethylene Terephthalate |
| Oxygen | 100< | 1 | 49 | 0.6 | 0.9 |

(Notes)
(1) Water vapor-transmission rate (WVTR) was measured by the method of JIS Z-0208 under the condition of a temperature of 40° C. and a relative humidity of 90%.
(2) To measure the methanol-permeability, a piece of film was inserted into a gas-permeability measuring cell of a YANAKO GTR 10XL (tradename, manufactured by Yanagimoto Seisakusho Co., Ltd.), methanol vapor diluted to a concentration of 50% by nitrogen at 60° C. and 0% RH was brought into contact with one side of the film, while nitrogen gas at 60° C. and 0% RH was brought into contact with the other side of the film, and the quantity of methanol which permeated the film was determined by gas chromatography. The permeability to other smoke components (model substances) were also measured by the same method metioned above.
(3) Oxygen gas-permeability was measured at a temperature of 30° C. and a relative humidity of 60% using a piece of film and OXTRAN-100 (tradename, manufactured by Modern Control Co.).

It is necessary that the film has oxygen gas-barrier property which is exhibited by an oxygen gas-permeability of less than a predetermined value, in order to preserve the smoked food for long periods. The oxygen gas-permeability of a film according to the present invention is not more than 50 cc/m$^2$.day.atm at a temperature of 30° C. and a relative humidity of 60%. Although ordinary food does not need secondary packaging if it is packaged with a film having an oxygen gas-permeability of not less than 200 cc/m$^2$.day.atm, food which is particularly susceptible to oxygen cannot be preserved for long periods in such a film, so that secondary packaging is necessary. In particular, if food such as meat paste, which is so susceptible to oxygen that the myoglobin etc., therein is apt to lose its color owing to the effect of oxygen, is packaged with a film having an oxygen gas-permeability of more than 50 cc/m$^2$.day.atm, it cannot store for long periods and the myoglobin or the like therein may lose its color.

A smokable food-packaging film according to the present invention having the properties of a permeability to 50% concentration of methanol of not less than 200 g/m$^2$.day.atm at a temperature of 60° C. and a relative humidity of 0%, an oxygen gas-permeability of not more than 50 cc/m$^2$.day.atm at a temperature of 30° C. and a relative humidity of 60%, and WVTR of not more than 70 g/m$^2$.day at a temperature of 40° C. and a relative humidity of 90% comprises a mixture composed of 45 to 85 wt % polyamide, 10 to 45 wt % olefin-vinyl alcohol copolymer, and 5 to 30 wt % polyolefin, in which the mixture falls in the pentagonal range defined in the ternary diagram of FIG. 1 by linear lines connecting the points A, B, C, D and E, respectively.

In FIG. 1, the point A indicates the composition of 85 wt % polyamide, 10 wt % olefin-vinyl alcohol copolymer and 5 wt % polyolefin; the point B indicates the composition of 60 wt % polyamide, 10 wt % olefin-vinyl alcohol copolymer and 30 wt % polyolefin; the point C indicates the composition of 45 wt % polyamide, 25 wt % olefin-vinyl alcohol copolymer and 30 wt % polyolefin; the point D indicates the composition of 45 wt % polyamide, 45 wt % olefin-vinyl alcohol copolymer and 10 wt % polyolefin; and the point E indicates the composition of 50 wt % of polyamide, 45 wt % of olefin-vinyl alcohol copolymer and 5 wt % polyolefin.

Furthermore, a smokable food-packaging film according to the present invention comprises preferably a mixture composed of 50 to 75 wt % polyamide, 20 to 40 wt % olefin-vinyl alcohol copolymer, and 5 to 20 wt % polyolefin, in which the mixture falls in the pentagonal range defined in FIG. 1 by linear lines connecting the points a, b, c, d and e, respectively.

In FIG. 1, if a packaging film is made of a mixture of a composition which falls in the hexagonal range defined in FIG. 1 by linear lines connecting the points X, X$_1$, B, C, Y$_2$ and Z, respectively, it is difficult to obtain the desired oxygen gas-barrier properties; if a packaging film is made of a mixture of a composition which falls in the trapezium range defined in FIG. 1 by linear lines connecting the points Y, X$_2$, Z$_1$ and Z, respectively, the mechanical strength, creep resistance, dimensional stability of the packaging film, the property of clinging to an article in conformity therewith and the smokability of the packaging film are reduced too much and accordingly it is difficult to obtain the desired smokable food-packaging film; and if a packaging film is made of a mixture of a composition which falls in the trapezium range defined in FIG. 1 by linear lines connecting the points X, Z$_2$, Y$_1$ and Y, respectively, the water vapor-barrier properties are lowered, and as a result, high loss of weight and then dryness of products in the smokable food-packaging film due to the high WVTR occur, and accordingly it is difficult to obtain the desired smokable food-packaging film therefrom.

As a polyamide according to the present invention, nylon 6, nylon 7, nylon 8, nylon 10, nylon 11, nylon 12, nylon 6 - 6, nylon 6 - 10, mixtures thereof and copolymers of the monomers thereof may be exemplified.

As a copolymer of olefin and vinyl alcohol according to the present invention, ethylene-vinyl alcohol copolymers, propylene-vinyl alcohol copolymers, and butene-1-vinyl alcohol copolymers may be exemplified.

The vinyl alcohol unit in a copolymer of α-olefin and vinyl alcohol is 40 to 80 mol %, preferably 50 to 70 mol %. If the vinyl alcohol unit is less than 40 mol %, it is difficult to obtain the desired oxygen gas-barrier property, while if the vinyl alcohol unit is more than 80 mol %, the thermal stability of the film is so reduced that it is difficult to stably manufacture a smokable food-packaging film.

As a polyolefin according to the present invention, polyethylene, polypropylene, ionomer resins, ethylene-vinyl acetate copolymers, ethylene-ethyl acrylate copolymers, ethylene-acrylic acid copolymer, ethylene-methacrylate copolymers, ethylene-methylmethacrylate copolymers, ethylene-methacrylic acid copolymers, resins of polyethylene or polypropylene graft-polymerized with unsaturated organic acid such as anhydride maleic acid may be exemplified.

In another embodiment of the present invention, a food-packaging film is composed of a laminate of a thermoplastic resin layer of a mixture of 45 to 85 wt % polyamide and 10 to 45 wt % copolymer of α-olefin and vinyl alcohol and 5 to 30 wt % of polyolefin, in which the mixture falls in the pentagonal range defined in FIG. 1 by linear lines connecting the points A, B, C, D and E, respectively, the layer having satisfactory smoking properties and oxygen gas-barrier property, and at least one layer selected from the group consisting of (a) an olefin copolymer such as polyethylene, polypropylene, polybutene-1, (b) a copolymer of ethylene, propylene or butene-1 and vinyl acetate or (metha) acrylic ester, (c) a copolymer of ethylene, propylene or butene-1 and (metha) acrylic acid, and a metal salt thereof, (d) an elastomer such as plasticized polyvinyl chloride, polyester and a styrene rubber, (e) a cellulose, and (f) a polyamide having an oxygen gas-permeability exceeding the value in accordance with the present invention (50 cc/m$^2$.day.atm).

The thickness of the smokable food-packaging film according to the present invention is 15 to 100 μm, preferably 20 to 60 μm. In a laminate film, the thickness of the thermoplastic resin film having smokability and oxygen gas-barrier property is 15 to 100 μm, and the thickness of the other layer(s) is preferably 10 to 50 μm.

Foodstuffs which are to be packaged with the food-packaging film according to the present invention have need of a smoking process and a good preservability during prolonged storage periods. Animal products such as ham, sausages, bacon and meat, dairy products such as cheese, processed marine products such as fish and shellfish, and processed eggs may be exemplified.

The food-packaging film of a thermoplastic resin according to the present invention is manufactured by an ordinary bubble process and either an unstretched or a stretched film (non-shrinkable or shrinkable film) is used depending on purpose. A stretched (shrinkable) film is obtained by stretching according to an ordinary method.

In the smoking process in the present invention, a package which is formed in an ordinary packaging process and optionally is dried, is placed in smoke chamber for a predetermined period (the period depends upon the food being smoked and is from several minutes to several hours), at a temperature of 15° to 80° C. The smoking temperature can be selected to be 15° to 30° C. (cold-smoking method), 30° to 50° C. (warm-smoking method), or 50° to 80° C. (hot-smoking method), but warm smoking and hot smoking methods which are capable of mass-production at a high temperature in a short period of time are preferable. The smoking may be conducted by an electrical smoking method in which an electric field is applied to an atmosphere of smoke of a hard wood such as oak and cherry wood, in an ordinary way.

A smokable food-packaging film according to the present invention has a good permeability to 50% concentration of methanol of not less than 200 g/m$^2$.day.atm, preferably not less than 300 g/m$^2$.day.atm and, more preferably, not less than 1,000 g/m$^2$.day.atm at a temperature of 60° C. and a relative humidity of 0%, and high oxygen gas-barrier property having an oxygen gas-permeability of not more than 50 cc/m$^2$.day.atm at a temperature of 30° C. and a relative humidity of 60%. In addition, the film is efficient in mechanical strength, the creep resistance, the dimensional stability, the property of clinging to an article in conformity therewith, and it is also efficient in smokability. Accordingly, the film is useful for the prolonged storage periods of smoked food-packages. In particular, it exhibits excellent smokability and oxygen gas-barrier property with respect to packages of foodstuffs which are susceptible to oxygen such as, for example, ham, sausages, meats and cheese, and is capable of storing them for long periods without secondary packaging.

The present invention will be explained hereinunder with reference to embodiments thereof.

EXAMPLES 1 TO 3, COMPARATIVE EXAMPLE 1

A polyamide resin of a copolymer of monomer of nylon 6 and monomer of nylon 6 - 6 (weight ratio of 85 to 15), a copolymer of ethylene and vinyl alcohol (molar ratio of 43 to 57), and polyethylene graft-polymerized with 0.5 wt % anhydride maleic acid were prepared. These three components were mixed in weight ratios of 7:2:1 (Example 1), 4.5:4.5:1 (Example 2) and 5:2:3 (Example 3). Each of the mixtures was extruded into a tubular form at a temperature of 230° C. using an extruder which is provided with a circular die at its tip, whereby unstretched tubular films of 40 μm in thickness and 70 mm in folded width were obtained as Examples 1, 2 and 3.

The permeability to 50% concentration of methanol at a temperature of 60° C. and a relative humidity of 0%, the oxygen gas-permeability at a temperature of 30° C. and a relative humidity of 60%, and WVTR at a temperature of 40° C. and a relative humidity of 90% of the films in Examples 1, 2 and 3 were measured by the above-described measuring method. The results are shown in Table 2. The tubular films of Examples 1, 2 and 3 were filled with about 200 g of pork sausage meat of 50 wt % pork, 20 wt % fat, 6 wt % starch, 2 wt % salt and 22 wt % water, and both ends of each sausage were clipped, thereby obtaining sausages of Examples 1, 2 and 3. Each sausage was dried in a smoke chamber for 15 minutes at a temperature of 60° C. and a relative humidity of 10 to 30%, and was thereafter smoked for 90 minutes at a temperature of 60° C. and a relative humidity of 40 to 60%. The smokability of the films of Examples 1, 2 and 3 were examined by the above-described sensory examination (panel tests), the results being shown in Table 2.

For Comparative Example 1, the methanol-permeability, oxygen gas-permeability and the smokability of the package of a cellulose casing on the market, which is 30 μm in thickness and 50 mm in folded width, were measured. The results are shown in Table 2.

TABLE 2

| | Example 1 | Example 2 | Example 3 | Comparative Example 1 |
|---|---|---|---|---|
| Sensory Test for Smokability | | | | |
| Taste | 2.7 | 2.3 | 1.8 | 3.0 |
| Fragrance | 2.4 | 2.8 | 1.5 | 3.5 |
| Methanol-Permeability (g/m$^2$ · day · atm) | 3,800 | 2,200 | 1,300 | 2,600 |
| Oxygen Permeability (cc/m$^2$ · day · atm) | 44 | 28 | 22 | 1,000<< |
| WVTR (g/m$^2$ · day) | 36 | 25 | 15 | — |
| Evaluation | | | | |
| Smokability | A | A | B | A |
| Preservability | A | A | A | D |

(Notes)
(I) Criteria for Evaluation:

TABLE 2-continued (i) smokability (panel tests performed by 10 panelists)
- A: Strongly recognizable smoked flavor ⎫
- B: Considerably strongly recognizable smoked flavor ⎬ (utilizable)
- C: Recognizable smoked flavor ⎭
- D: Slightly recognizable smoked flavor ⎫ (Not utilizable)
- E: No smokability (smoking has no effect) ⎭

(ii) Long-period
- A: Excellent (more than 60 days) ⎫
- B: Good (more than 30 days) ⎬ (Utilizable)
- C: Fair (not utilizable)
- D: Bad (not utilizable)

(II) Criteria for Smokability (Sensory Test): (panel tests performed by 10 panelists)
- 0: No smokability (smoking has no effect)
- 1: Recognizable smoked flavor
- 2: Clearly recognizable smoked flavor
- 3: Strongly recognizable smoked flavor
- 4: Remarkable smoked flavor As is obvious from Table 2, smoked food packages according to the present invention have both good smokability and high preservability, and it is not necessary to package the thus smoked food packages again with an ordinary film having oxygen gas-barrier property even with respect to foodstuffs which are susceptible to oxygen.

COMPARATIVE EXAMPLES 2 TO 5

For Comparative Example 2, a piece of stretched polyethylene terephthalate film (thickness: 12 μm) on the market was formed into a tubular film of 50 mm in folded width, using an adhesive. For Comparative Examples 3, 4 and 5, low-density (0.92) polyethylene, nylon 6, and a copolymer of monomer of nylon 6 and monomer of nylon 6 - 6 in a weight ratio of 85 to 15, respectively, were used and tubular unstretched films of 40 μm in thickness and 50 mm in folded width were obtained by the same method as that of Example 1. The results of measurements of the methanol-permeability and oxygen gas-permeability of these films, conducted in the same way as that of Example 1, are shown in Table 3.

TABLE 3

| | Comparative Example 2 | Comparative Example 3 | Comparative Example 4 | Comparative Example 5 |
| --- | --- | --- | --- | --- |
| Sensory Test of Smokability | | | | |
| Taste | 0 | 1.7 | 2.3 | 2.7 |
| Fragrance | 0.3 | 1.8 | 2.4 | 2.4 |
| Methanol-Permeability (g/m$^2$ · day · atm) | 13 | 910 | 4,500 | 5,900 |
| Oxygen-Permeability (cc/m$^2$ · day · atm) | 120 | 1,000< | 80 | 100 |
| Evaluation | | | | |
| Smokability | E | B | A | A |
| Preservability | C | D | C | C |

Criteria for Evaluation and Sensory Test for Smokability: Same as in Table 2

EXAMPLE 4

A mixture (weight ratio = 6:3:1) of the same polyamide as that of Example 1, a copolymer of ethylene and vinyl alcohol (molar ratio of 31 to 69) and polyethylene was prepared as an outer layer. A copolymer of ethylene and vinyl acetate (weight ratio of 67 to 33) was prepared as an inner layer. The outer and inner layers were co-extruded at 200° C., to obtain a tubular laminate. The laminate was stretched at 70° C. by an ordinary inflation method to obtain a tubular stretched film of 40 μm in thickness (thickness of the outer layer: 25 μm and that of the inner layer: 15 μm) and 70 mm in folded width.

The methanol-permeability, the oxygen gas-permeability, WVTR and the smoking effect of the thus-obtained film were measured in the same way as that of Example 1. The results are shown in Table 4.

TABLE 4

| | Example 4 |
| --- | --- |
| Sensory Test for Smokability | |
| Taste | 1.3 |
| Fragrance | 1.6 |
| Methanol-Permeability (g/m$^2$ · day · atm) | 1100 |
| Oxygen-Permeability (cc/m$^2$ · day · atm) | 45 |
| WVTR (g/m$^2$ · day) | 45 |
| Evaluation | |
| Smokability | B |
| Preservability | A |

Criteria for Evaluation and Sensory Test for Smokability: Same as in Table 2

As is obvious from Table 4, smoked food packages according to the present invention have both good smokability and high preservability, and it is not necessary to package the thus smoked food packages again with an ordinary film having oxygen gas-barrier property even with respect to foodstuffs which are susceptible to oxygen.

EXAMPLES 5 TO 7

The same polyamide and ethylene-vinyl alcohol copolymer as those of Example 1 and ionomer resin (HI-MILAN (produced by Mitsui Poly Chemical Co., Ltd)) were mixed in weight ratios of 7:1.5:1.5 (Example 5), 6:2:2 (Example 6) and 5:3:2 (Example 7), to obtain a stretched tubular film of 40μm in thickness and 70 mm in folded width in the same way as that of Example 1.

The methanol-permeability, the oxygen gas-permeability, WVTR and the smokability of the thus-obtained film were measured in the same way as that of Example 1. The results are shown in Table 5.

TABLE 5

| | Example 5 | Example 6 | Example 7 |
| --- | --- | --- | --- |
| Sensory Test for Smokability | | | |
| Taste | 2.6 | 2.4 | 2.0 |
| Fragrance | 2.8 | 2.6 | 1.8 |
| Methanol-Permeability (g/m$^2$ · day · atm) | 3200 | 2600 | 1500 |
| Oxygen-Permeability (cc/m$^2$ · day · atm) | 49 | 42 | 36 |
| WVTR | 31 | 20 | 15 |

TABLE 5-continued

| | Example 5 | Example 6 | Example 7 |
|---|---|---|---|
| (g/m² · day) | | | |
| Evaluation | | | |
| Smokability | A | A | B |
| Preservability | A | A | A |

Criteria for Evaluation and Sensory Test for Smokability: Same as in Table 2

As is obvious from Table 5, smoked food packages according to the present invention have both good smokability and high preservability, and it is not necessary to package the thus smoked food package again with an ordinary film having oxygen gas-barrier properties even with respect to foodstuffs which are susceptible to oxygen.

EXAMPLE 8

The same mixture as that of Example 5 was extruded by means of an extruder provided with a circular die at its tip to produce an unstretched tubular film of 40 μm in thickness.

The methanol-permeability, the oxygen gas-permeability, WVTR and the smokability of the thus-obtained film were measured in the same way as that of Example 1. The results are shown in Table 6.

TABLE 6

| | Example 8 |
|---|---|
| Sensory Test for Smokability | |
| Taste | 2.9 |
| Fragrance | 3.1 |
| Methanol-Permeability (g/m² · day · atm) | 8600 |
| Oxygen-Permeability (cc/m² · day · atm) | 49 |
| WVTR (g/m² · day) | 48 |
| Evaluation | |
| Smokability | A |
| Preservability | A |

Criteria for Evaluation and Sensory Test for Smokability: Same as in Table 2

As is seen from Table 6, smoked food packages according to the present invention have both good smokability and high preservability, and it is not necessary to package the thus smoked food packages again with an ordinary film having oxygen gas-barrier property even with respect to foodstuffs which are susceptible to oxygen.

EXAMPLE 9

A mixture (weight ratio=6:3:1) of the same polyamide as that of Example 1, a copolymer of ethylene and vinyl alcohol (molar ratio of 31 to 69) and polyethylene was extruded at 230° C. to obtain a tubular film. The film was stretched at 70° C. by an ordinary inflation method to obtain tubular stretched film of 40 μm in thickness and 70 mm in folded width.

The methanol-permeability, the oxygen gas-permeability, WVTR and the smoking effect of the thus obtained film were measured in the same way as that of Example 1. The results are shown in Table 7.

TABLE 7

| | Example 9 |
|---|---|
| Sensory Test for Smokability | |
| Taste | 2.4 |
| Fragrance | 2.5 |
| Methanol-Permeability (g/m² · day · atm) | 2800 |

TABLE 7-continued

| | Example 9 |
|---|---|
| Oxygen-Permeability (cc/m² · day · atm) | 32 |
| WVTR (g/m² · day) | 34 |
| Evaluation | |
| Smokability | A |
| Preservability | A |

Criteria for Evaluation and Sensory Test for Smokability: Same as in Table 2

As is seen in Table 9, smoked food packages according to the present invention has both good smokability and high preservability, and it is not necessary to package the thus smoked food packages again with an ordinary film having oxygen gas-barrier property even with respect to foodstuffs which are susceptible to oxygen.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A smokable food-packaging film, comprising: at least one layer of a mixture of 45 to 85 wt % nylon, 10 to 45 wt % copolymer of olefin and vinyl alcohol, and 5 to 30 wt % polyolefin, in which the mixture falls in the pentagonal range defined in FIG. 1 by linear lines connecting the points A, B, C, D and E, respectively, said layer having the properties of a permeability to 50% concentration of methanol of not less than 200 g/m².day.atm at a temperature of 60° C. and a relative humidity of 0%, an oxygen gas-permeability of not more than 50 cc/m².day.atm at a temperature of 30° C. and a relative humidity of 60 %, and a water vapor-transmission rate of not more than 70 g/m².day at a temperature of 40° C. and a relative humidity of 90%.

2. The smokable food-packaging film according to claim 1, wherein said nylon is nylon 6, nylon 7, nylon 8, nylon 10, nylon 11, nylon 12, nylon 6 - 6, nylon 6 - 10, a mixture thereof or a copolymer of the monomers thereof.

3. The smokable food-packaging film according to claim 1, wherein said olefing is ethylene, propylene, or butene-1.

4. The smokable food-packaging film according to claim 1, wherein the vinyl alcohol unit content of said olefin and vinyl alcohol copolymer ranges from 40 to 80 mol %.

5. The smokable food-packaging film according to claim 1, wherein said polyolefin is polyethylene, polypropylene, an ionomer resin, an ethylene-vinyl acetate copolymer, an ethylene-acrylic acid copolymer, an ethylene-ethyl acrylate copolymer, an ethylene-methacrylate copolymer, an ethylene-methylmethacrylate copolymer, an ethylene-methacrylic acid copolymer, or a resin of polyethylene or polypropylene graft-polymerized with and unsaturated organic acid.

6. The smokable food-packaging film according to claim 1, wherein said polyolefin ingredient is polyethylene.

7. A smokable food-packaging film, comprising:
   a layer of a mixture of 45 to 85 wt. % nylon, 10 to 45 wt. % copolymer of an olefin and vinyl alcohol, and 5 to 30 wt. % polyolefin, in which said mixture falls within the pentagonal range defined in FIG. 1 by linear lines connecting the points A, B, C, D and E respectively, said layer having a permeability to 50% concentration of methanol of not less than 200 g/m²·day·atm at a temperature of 60° C. and a relative humidity of 0%, an oxygen gas permeability of not more than 50 cc/m²·day·atm at a temperature of 30° C. and a relative humidity of 60%, and a water vapor transmission rate of not more than 70 g/m²·day at a temperature of 40° C. and a relative humidity of 90%; and at least one layer prepared from a material selected from a group consisting of (a) an olefin copolymer of polyethylene, polypropylene or polybutene-1, (b) a copolymer of ethylene, propylene or butene-1 and vinyl acetate or (meth)acrylic ester, (c) a copolymer of ethylene, propylene or butene-1 and (meth)acrylic acid or a metal salt thereof, (d) an elastomer of plasticized polyvinyl chloride, polyester or a styrene rubber, (e) a cellulose, and (f) a polyamide having an oxygen gas permeability of more than 50 cc/m²·day·atm at a temperature of 30° C. and a relative humidity of 60%.

8. The smokable food-packaging film according to claim 1 or 7, wherein the thickness of said layer of a mixture of nylon, a copolymer of olefin and vinyl alcohol, and polyolefin is 15 to 100 μm.

9. A smoked food package comprising a foodstuff which is packaged in a smokable film according to claim 1 or 7.

10. A smokable food-packaging film, comprising:

a layer of a mixture of 45 to 85 wt. % nylon, 10 to 45 wt. % of an olefin and vinyl alcohol copolymer and 5 to 30 wt. % of a polyolefin, in which the mixture falls within the pentagonal range defined in FIG. 1 by linear lines containing the points A, B, C, D and E respectively, said layer having a permeability to 50% concentration of methanol of not less than 200 g/m²·day·atm at a temperature of 60° C. and a relative humidity of 0%, an oxygen gas permeability of not more than 50 cc/m²·day·atm at a temperature of 30° C. and a relative humidity of 60%, and a water vapor transmission of not more than 70 g/m²·day at a temperature of 40° C. and a relative humidity of 90%; and at least one layer of an olefin copolymer of polyethylene, polypropylene or polybutene-1.

* * * * *